(12) United States Patent
Soman et al.

(10) Patent No.: US 10,333,975 B2
(45) Date of Patent: Jun. 25, 2019

(54) ENHANCED COMPUTING SYSTEM SECURITY USING A SECURE BROWSER

(71) Applicant: VMware, Inc., Palo Alto, CA (US)

(72) Inventors: Sisimon Soman, Sunnyvale, CA (US); Anurag Katiyar, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 113 days.

(21) Appl. No.: 15/370,665

(22) Filed: Dec. 6, 2016

(65) Prior Publication Data
US 2018/0159896 A1 Jun. 7, 2018

(51) Int. Cl.
| | |
|---|---|
| *H04L 29/06* | (2006.01) |
| *G06F 9/50* | (2006.01) |
| *G06F 21/53* | (2013.01) |
| *G06F 9/451* | (2018.01) |
| *G06F 9/455* | (2018.01) |
| *H04L 29/08* | (2006.01) |

(52) U.S. Cl.
CPC .......... *H04L 63/1491* (2013.01); *G06F 9/452* (2018.02); *G06F 9/45558* (2013.01); *G06F 9/50* (2013.01); *G06F 21/53* (2013.01); *H04L 63/10* (2013.01); *H04L 67/02* (2013.01); *G06F 2009/45579* (2013.01); *H04L 63/0263* (2013.01)

(58) Field of Classification Search
CPC ................ H04L 63/1491; H04L 63/10; H04L 63/0263; H04L 67/02
USPC .......................................................... 726/23
See application file for complete search history.

(56) References Cited

U.S. PATENT DOCUMENTS

| | | | | |
|---|---|---|---|---|
| 8,209,408 | B1* | 6/2012 | Huang | G06F 9/45558 709/223 |
| 8,370,899 | B2* | 2/2013 | Shoval | G06F 21/50 726/2 |
| 2005/0044396 | A1* | 2/2005 | Vogel | G06F 21/6218 726/6 |
| 2010/0115621 | A1* | 5/2010 | Staniford | H04L 63/1416 726/25 |
| 2011/0239291 | A1* | 9/2011 | Sotka | H04L 63/1408 726/14 |
| 2015/0156203 | A1* | 6/2015 | Giura | H04L 63/101 726/4 |

* cited by examiner

*Primary Examiner* — Michael S McNally

(57) ABSTRACT

Described herein are systems, methods, and software to provide secure browsers to end user devices. In one implementation, a secure browsing service receives, over a network, a request for an internet browser from an end user device. The secure browsing service further, in response to the request, allocates a virtual machine with an instance of the internet browser executing thereon to the end user device, and provide a remote connection to the internet browser on the virtual machine to the end user device.

17 Claims, 8 Drawing Sheets

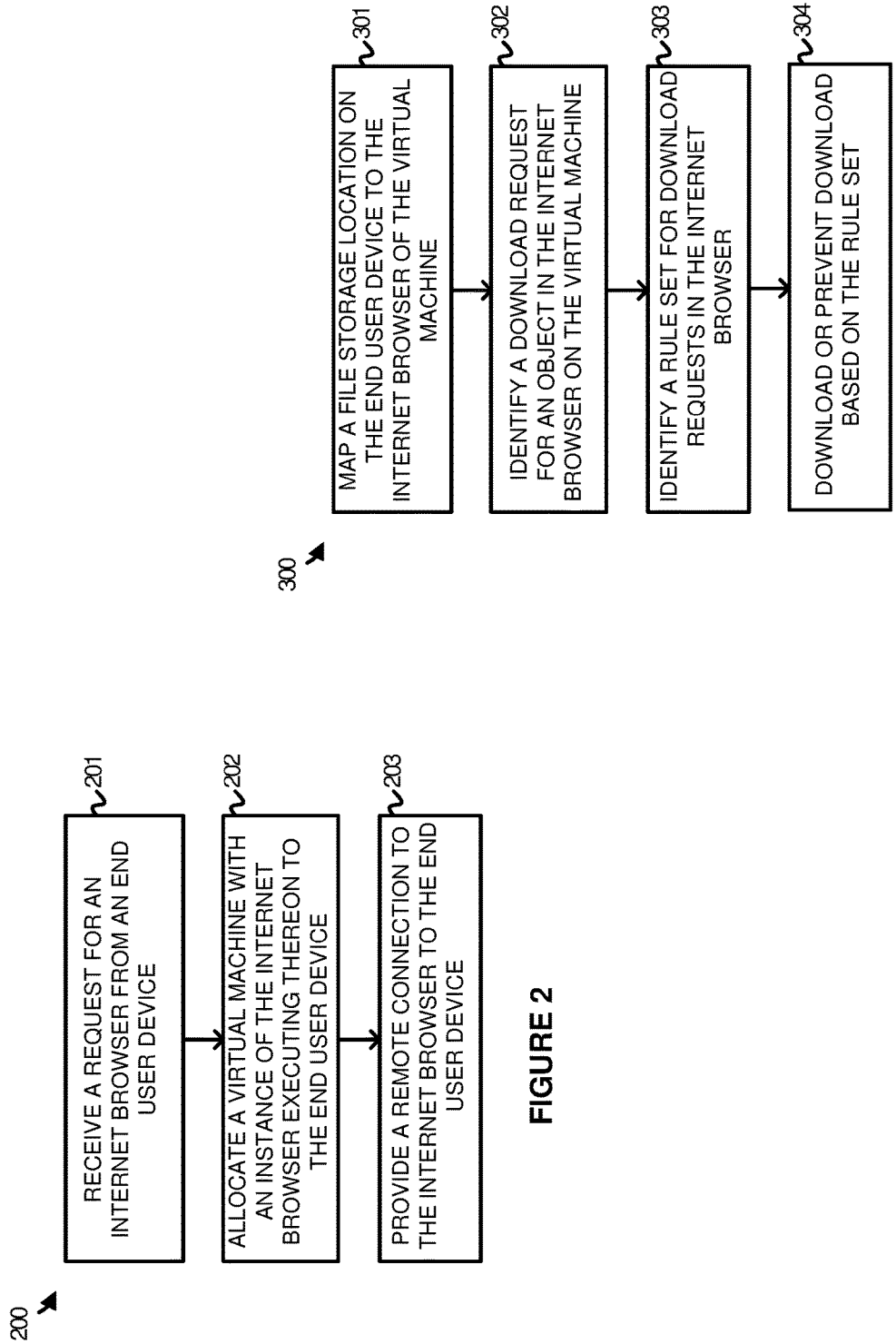

ENHANCED COMPUTING SYSTEM SECURITY USING A SECURE BROWSER

BACKGROUND

Internet browsers are software applications for retrieving, presenting, and traversing information resources on the World Wide Web. These information resources are identified by uniform resource identifiers or locators (URIs/URLs) and may comprise a web page, an image, a video, or some other piece of content. Internet browsers may further be used to access information provided by web servers in private networks or files in file systems. To provide the content, a request may be generated by the browser to a server that hosts the requested content. In response to the request, the server may provide the content to the browser, which in turn presents the content to the end user.

Although browsers provide an efficient tool for accessing resources over the internet, browsers are often the source of malicious processes and software that get implemented on an end user device. These malicious processes may include malware, spyware, ransomware, or some other similar malicious process that is undesirable for the end user of the computing system. To protect against these processes, browsers may attempt to sandbox and monitor the information that is being provided from the host servers. However, vulnerabilities still exist that can provide malicious content access to the end user computing system despite the sandboxing and security precautions on the local device.

OVERVIEW

The technology disclosed herein enhances browser security on end user computing systems. In one implementation, a method of providing secure browsers to end user devices includes, in a secure browsing service, receiving, over a network, a request for an internet browser from an end user device. The method further includes, in response to the request, allocating a virtual machine with an instance of the internet browser executing thereon to the end user device, and providing a remote connection to the internet browser on the virtual machine to the end user device.

In one implementation, the method further includes mapping a file storage location on the end user device to the internet browser of the virtual machine, and identifying a download request for an object in the internet browser on the virtual machine. The method also includes identifying a rule set for download requests in the internet browser, determining whether a download of the object associated with the download request is permitted based on the rule set and, if the download request is permitted, downloading the object to the file storage location.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates an operation of a secure browsing service according to an implementation.

FIG. 3 illustrates an operation of a secure browsing service according to an implementation.

DETAILED DESCRIPTION

The various examples disclosed herein offer enhancements for providing secure browsing to end user computing systems. In particular, end user computing systems rely on internet browsers to retrieve, present, and traverse different resources on the World Wide Web. These resources may provide web pages, images, videos, documents, executables, and other similar content to the users of the computing systems. However, because content is capable of being downloaded locally to an end user computing system, or is capable of being executed in the browser of the end user computing system, it is difficult to ensure that no malicious processes are executed on the end user device.

Here, to assist in providing security on an end user device, a secure browsing service is provided, wherein instances of web browsers execute in virtual machines on a separate computing system rather than on the local device. In particular, in response to a triggering event on the local device, the device may transfer a request to the secure browsing service to instantiate a remote connection session with a virtual machine executing a browser instance. In response to the request, the service may identify a virtual machine that can support the request, and provide a remote connection to the virtual machine, permitting access to the browser executing thereon. The user may thus seamlessly navigate the browser as if it were locally installed and in some cases may be unaware of the fact that the browser is actually executing on a different device.

In some examples, to allocate and make the virtual machine available to the end user device, a broker may be used that can provide addressing and other security credentials to the end user device. Based on the addressing and security information, the end user device may communicate with the virtual machine to provide a remote view of the browser instance to the user of the end user device.

Figure 1:
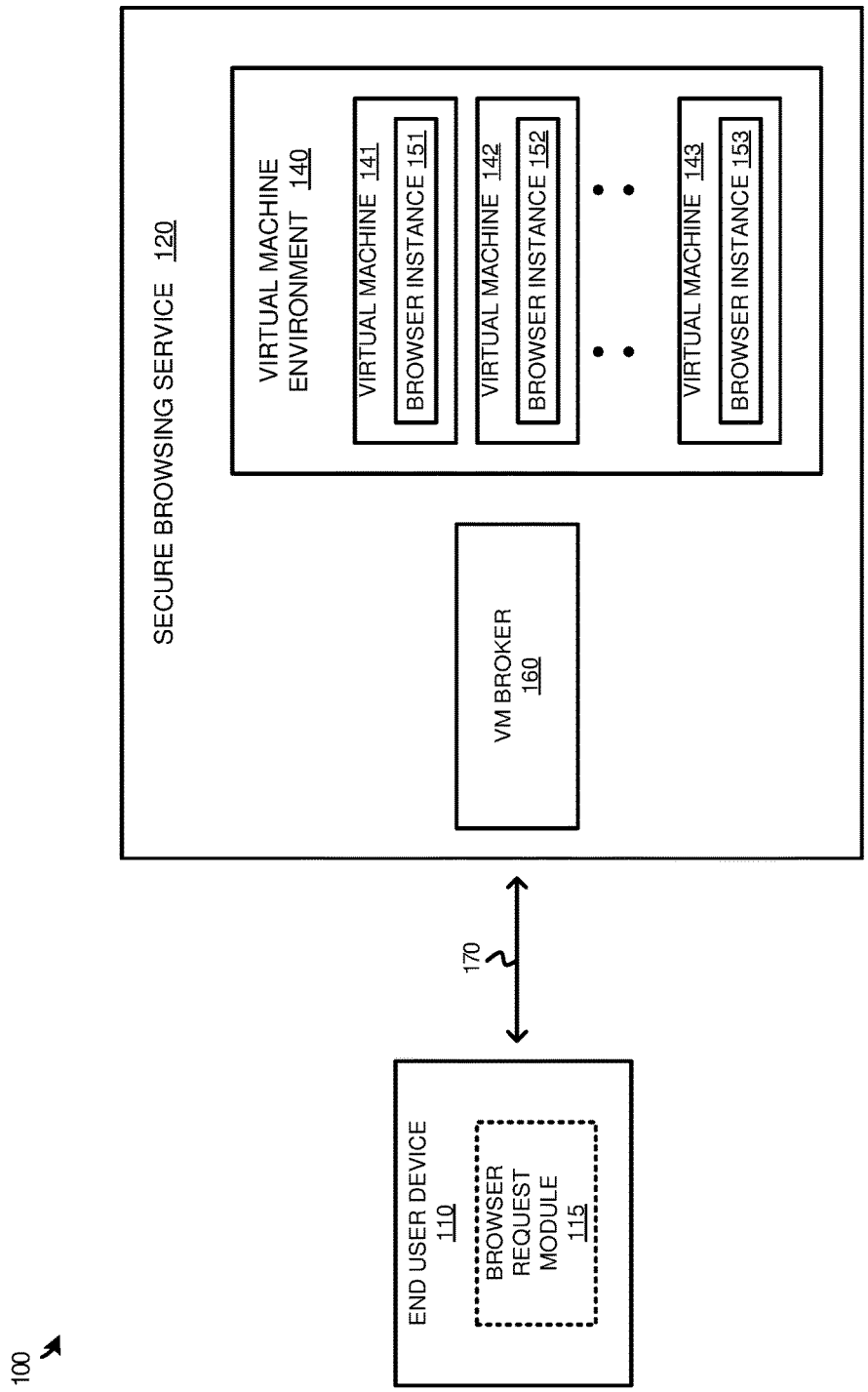
FIG. 1 illustrates a computing environment to provide secure browsers to end user devices according to an implementation.

Referring now to FIG. 1, FIG. 1 illustrates a computing environment 100 to provide secure browsers to end user devices according to an implementation. Computing environment 100 includes end user device 110 and secure browsing service 120. End user device 110 further includes browser request module 115 to request sessions with virtual machines. Secure browsing service 120 further includes virtual machine (VM) broker 160 and virtual machine environment 140 with virtual machines 141-143 executing browser instances 151-153. End user device 110 communicates with secure browsing service 120 via communication link 170. Secure browsing service 120 may be accessed by end user device 110 using the internet, the intranet, or some other similar communication network. Although illustrated with three virtual machines in the present example, it should be understood that secure browsing service 120 may include any number of virtual machines to provide internet browsers to requesting end user devices.

In operation, end user device 110 executes various software applications and processes to provide desired operations to the user of end user device 110. These processes include at least a browser request module 115 capable of requesting and managing browser instances provided through the use of virtual machines. In particular, when a secure browser instance is required, browser request module 115 may transfer a request to secure browsing service 120, wherein secure browsing service 120 may, in turn, provide end user device 110 with a required virtual machine.

As depicted in the example of FIG. 1, secure browsing service includes a virtual machine broker 160 and a plurality of virtual machines 141-143 that may operate on one or more host serving computing systems. When a request is received from an end user device, such as end user device 110, virtual machine broker 160 will identify a virtual machine capable of servicing the request, and provide a remote connection to the virtual machine, permitting the end user device to remotely display and receive input for the internet browser executing on the virtual machine. Thus, rather than executing a browser locally at end user device 110, the browser may be executed via a remote virtual machine that can be provided via a user interface on end user device 110.

To further demonstrate the operations of computing environment 100, FIG. 2 is provided. FIG. 2 illustrates an operation 200 of a secure browsing service according to an implementation. The operations in FIG. 2 are referenced parenthetically in the paragraphs that follow with reference to systems and objects of computing environment 100 of FIG. 1.

As depicted in FIG. 2, secure browsing service 120 receives (201) a request for an internet browser from end user device 110. In some implementations, in transferring the request, the end user device may receive be an explicit request from a user on end user device 110, wherein the user may select an icon or some other initiation mechanism to provide a secure remote browser. In other implementations, browser request module 115 may monitor the operations of the user on a local browser installed at end user device 110. This monitoring may permit browser request module 115 to identify the websites and other online resource destinations of the end user, and determine whether they should be handled via the local browser or through an external browser of secure browsing service 120. The determination may be made based on the uniform resource identifiers or locators (URIs/URLs) associated with requests, the IP addresses associated with requests, or some other similar determination based on the browsing operations of the end user. Once a request by the end user corresponds to an untrusted web destination (URL or IP address) that requires the use of secure browsing service 120, a request may be transferred to the secure browsing service 120 to accommodate the secure browsing requirement.

After receiving the request from end user device 110, operation 200 further directs secure browsing service 120 to allocate (202) a virtual machine with an instance of the internet browser executing thereon to the end user device. In some implementations, to accommodate the request, virtual machine broker 160 may be used, wherein virtual machine broker 160 is used to distribute end user requests to the various virtual machines in virtual machine environment 140. This distributing may be based on the requirements from the end user device (such as a particular type of browser), the load distribution on host servers for virtual machine environment 140, or some other similar distribution determination, including combinations thereof. For example, in the request generated by end user device 110, an indication may be made selecting a particular type of browser that is required by the end user. Based on the indication, virtual machine broker 160 may select a virtual machine with the particular browser version for the requesting end user device.

In some implementations, the virtual machine that is allocated for the request may comprise an idle virtual machine that is currently executing in virtual machine environment 140. In other implementations, the virtual machine may be required to be started or transitioned into an awake state. Thus, a new virtual machine may be added in virtual machine environment 140 in response to the request by end user device 110.

After allocating the virtual machine to end user device 110, secure browsing service 120 further provides (203) a remote connection to the internet browser to end user device 110. This remote connection may permit end user device 110 to present the browser as though the browser is locally executing on the virtual machine, although it is executing in a remote virtual machine. In particular, the remote connection may be used to make the browser appear as a local application window on end user device 110. In some implementations, to provide the remote connection, secure browsing service 120 may provide addressing information and security credentials to the end user device to access the particular virtual machine. This addressing information and any security credentials permit the end user device to receive the visual representation of the browser executing in the virtual machine, as well as provide user input to the browser to the virtual machine.

The remote connection between the browser on the virtual machine and the end user device can be implemented using a desktop remoting technology, such as Remote Desktop Services (RDS), Virtual Desktop Infrastructure (VDI), Desktop-as-a-Service (DAAS) or the like. Using such desktop remoting technologies, a user can be allowed to access a virtual desktop or application executing on a virtual machine over a remote network connection, such as a WAN connection. The virtual machine is hosted on a server that is physically located in a data center remotely located with respect to the end user device. When the device is used to access the browser on the virtual machine, the browser execution takes place on the remote host server which is linked to the end user device over a network, using a remote display protocol such as remote desktop protocol (RDP), PC-over-IP (PCoIP), Blast, virtual network computing (VNC), or the like. Using such a remote desktop protocol, the user can interact with the browser running on the virtual machine hosted on the remote host server, such that only the display, keyboard, and mouse information is communicated with the end user device.

When the end user device is accessing the browser on the virtual machine using a remote desktop protocol, the graphical user interface (GUI) of the desktop is generated on the server hosting the virtual machine and the GUI image data is then encoded and transmitted over the network to the client device, where it is decoded and displayed to the user. For example, the framebuffer pixel data produced by the browser operating on the virtual machine may be encoded using a codec, such as H264, and transmitted over an Internet connection to the end user device, where the data is decoded and rendered in the secure browser window displayed on the screen of the end user device. Any user input information, such as keyboard and mouse events detected over the secure browser window on the end user device, are transmitted from the device to the virtual machine over the network connection, where it may in turn cause various updates to the browser. In this manner, the user is able to view the GUI of the browser and interact with it as if the browser was actually running on the local end user device even though the browser is actually executing on a remote server. In some cases, the user may be entirely unaware that the browser is not executing locally. However, because the browser is actually operating on a remote server with only image data being transmitted to the end user device, any security vulnerabilities that may be introduced to the browser would be limited to the virtual machine on the remote server and would not find its way to the end user device. Furthermore, once the user closes the secure browser window, the virtual machine on the remote server may be refreshed or deleted, thereby cleaning any possible malware that may have been introduced by the browser execution.

Turning to FIG. 3, FIG. 3 illustrates an operation 300 of a secure browsing service according to an implementation. Operation 300 is an example operation of a secure browsing service to provide download operations using a browser in a virtual machine. The operations in FIG. 3 are referenced parenthetically in the paragraphs that follow with reference to systems and objects of computing environment 100 of FIG. 1.

As described in the example of FIG. 2, a device may request and receive a virtual session to provide a secure instance of a web browser. In some examples, in addition to providing access to the secure browser, secure browsing service 120 may further be configured to map (301) a file storage location on end user device 110 to the internet browser executing in the virtual machine. Once mapped, an extension or some other software module operating with the internet browser may be configured to identify (302) a download request for an object in the internet browser on the virtual machine. This download request may be for an image, a video, an executable, or some other file type from a location using the internet browser.

In response to identifying the object, operation 300 further includes identifying (303) a rule set for download requests in the internet browser, and downloading (304) or preventing the download of the object based on the rule set. The rule set may apply various rules identifying content sources from which content can be downloaded, and could define whitelist (permitted) sources or blacklist (unpermitted) sources. These sources may be identified based on the URI associated with the request or the IP address associated with the request. In some implementations, in defining the rule set, the rule set may be based on an identifier associated with end user device 110 or the user of end user device 110. Accordingly, when a first device requests an instance of the internet browser, a first rule set may be identified for downloads, whereas when a second user device requests an instance of the internet browser, a second rule set may be identified for the downloads.

If it is determined that the download is permitted based on the rule set, the object may be downloaded by the browser on the virtual machine to the mapped storage location local to end user device 110. In some implementations, the download may occur directly from the web server of the requested content to the mapped storage location on end user device 110. In other implementations, the object may be downloaded from the webserver and cached, at least partially, in the virtual machine before being provided to the mapped location on end user devie 110. As an illustrative example, if the request were generated for an image from an approved content location, the browser may download the object to the mapped location, wherein the mapped location may be mapped using an access path that may comprise an IP address, a directory name, a file name, or any other path information, including combinations thereof for the end user device. Once downloaded, the user at end user device 110 may access the file locally by opening the file from the download location and, in some examples, opening an application associated with the file.

In some implementations, in defining the file storage location on the end user device, the end user device may provide an access path to the file storage location. This access path may be provided in the initial request to secure browsing service 120, once the virtual machine is allocated to the end user device, or at some other instance in providing the remote connection to the end user device. In other implementations, secure browsing service may determine at least partially a default file storage location on the end user device. For example, secure browsing service may use the default downloads folder for the Microsoft Windows operating system and generate a mapping to the downloads folder on the end user device.

Figure 4:
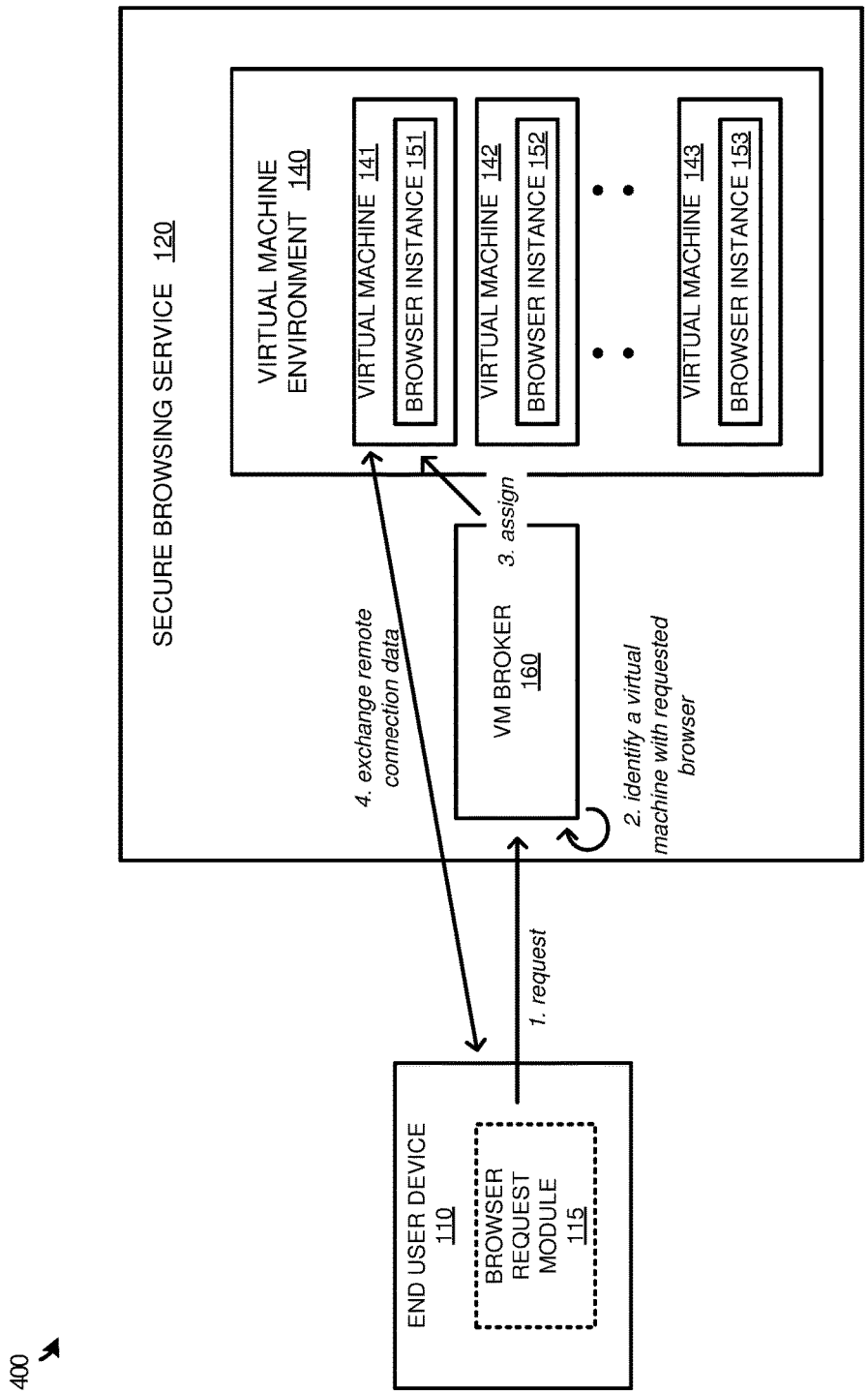
FIG. 4 illustrates an operational scenario of providing a secure browser to an end user device according to an implementation.

FIG. 4 illustrates an operational scenario 400 of providing a secure browser to an end user device according to an implementation. Operational scenario 400 includes systems and elements from computing environment 100 of FIG. 1.

As depicted, end user device 110 includes browser request module 115 to determine when a secure browser is to be requested from secure browsing service 120. This module may be used to detect an explicit request from the user of end user device 110 or may be used to identify a triggering event related to the current browsing operations of the end user using a locally installed browser. For example, browser request module 115 may be used to monitor, as an extension or some other software module, the URIs and IP addresses accessed by a browser executing locally on end user device 110. Based on the browsing URIs and IP addresses, browser request module 115 may determine that a secure browser is required to accommodate a request for the end user. Accordingly, if the user typed in a particular URI, browser request module 115 may compare the URI to blacklist or whitelist rules to determine whether the request should be processed locally via the local browser or externally via a browser executing on a virtual machine.

Once a secure browsing event is detected, either through monitoring or explicit request, browser request module 115 may transfer, at step 1, a request over a network to virtual machine broker 160. In response to receiving the request, virtual machine broker 160 will allocate a virtual machine to the request by identifying, at step 2, a virtual machine with the requested browser for end user device 110. In some implementations, the virtual machines in virtual machine environment 140 may execute a variety of different browsers, such as Microsoft Edge, Google Chrome, Mozilla Firefox, or any other similar browser. As a result, virtual machine broker 160 may be required to identify a virtual machine in accordance with the browser requested by 160. After the virtual machine is identified with the required browser, virtual machine broker 160 allocates the virtual machine by assigning, at step 3, the identified virtual machine to be used in a virtual session with end user device 110. In the present example, virtual machine broker 160 identifies virtual machine 141 with browser instance 151 to be used for the operations with end user device. Consequently, once identified, virtual machine broker 160 may provide addressing and security information to end user device 110 and/or virtual machine 141 to support the remote connection.

In providing the remote connection, end user device 110 and virtual machine 141 may exchange remote connection data. In particular, virtual machine 141 may provide remote connection data corresponding to a view of browser instance 151 executing on virtual machine 141. In turn, end user device 110 may display the browser to a user of end user device 151, and permit user input regarding the display, which may be transferred back to virtual machine 141 and browser instance 151 to manage operations within the browser.

The remote connection between the browser on the virtual machine and the end user device can be implemented using a desktop remoting technology, such as RDS, VID, DAAS, or the like. Using such desktop remoting technologies, a user can be allowed to access a virtual desktop or application executing on a virtual machine over a remote network connection, such as a WAN connection. The virtual machine is hosted on a server that is physically located in a data center remotely located with respect to the end user device. When the device is used to access the browser on the virtual machine, the browser execution takes place on the remote host server which is linked to the end user device over a network, using a remote display protocol such as RDP, PCoIP, Blast, VNC, or the like. Using such a remote desktop protocol, the user can interact with the browser running on the virtual machine hosted on the remote host server, such that only the display, keyboard, and mouse information is communicated with the end user device.

Figure 5:
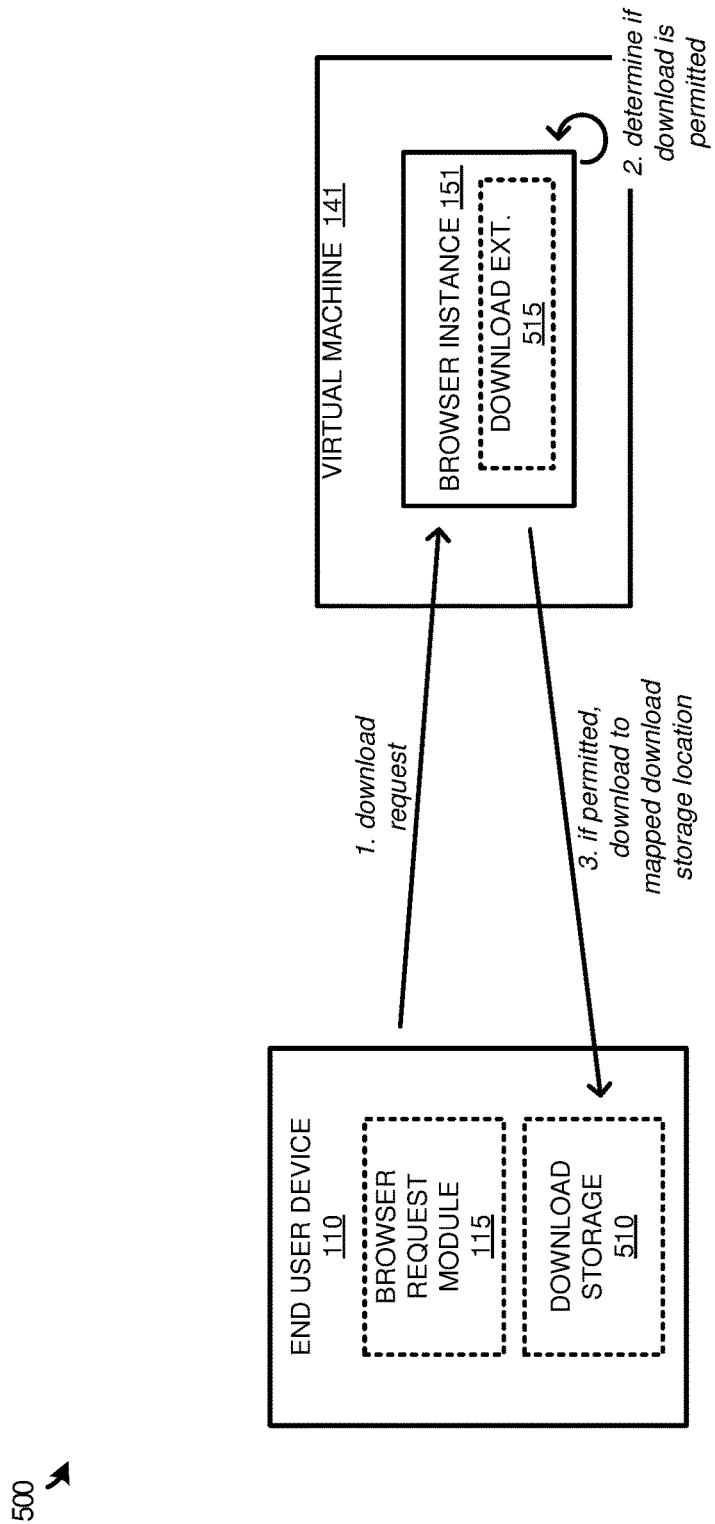
FIG. 5 illustrates an operational scenario of managing download requests according to an implementation.

When the end user device is accessing the browser on the virtual machine using a remote desktop protocol, the GUI of the desktop is generated on the server hosting the virtual machine and the GUI image data is then encoded and transmitted over the network to the client device, where it is decoded and displayed to the user. For example, the framebuffer pixel data produced by the browser operating on the virtual machine may be encoded using a codec, such as H264, and transmitted over an Internet connection to the end user device, where the data is decoded and rendered in the secure browser window displayed on the screen of the end user device. Any user input information, such as keyboard and mouse events detected over the secure browser window on the end user device, are transmitted from the device to the virtual machine over the network connection, where it may in turn cause various updates to the browser. In this manner, the user is able to view the GUI of the browser and interact with it as if the browser was actually running on the local end user device even though the browser is actually executing on a remote server. In some cases, the user may be entirely unaware that the browser is not executing locally. However, because the browser is actually operating on a remote server with only image data being transmitted to the end user device, any security vulnerabilities that may be introduced to the browser would be limited to the virtual machine on the remote server and would not find its way to the end user device. Furthermore, once the user closes the secure browser window, the virtual machine on the remote server may be refreshed or deleted, thereby cleaning any possible malware that may have been introduced by the browser execution To further illustrate the connection between end user device 110 and virtual machine 141, FIG. 5 is provided. FIG. 5 illustrates an operational scenario 500 of managing download requests according to an implementation. Operational scenario 500 is a continuation of the operations provided in operational scenario 400 of FIG. 4. In particular, operational scenario 500 includes end user device 110 and virtual machine 141, wherein virtual machine 141 may be used to provide a remote internet browser 151 to end user device 110. End user device 110 further includes a downloadable storage 510, which may comprise a file storage location for files from virtual machine 141, and browser instance 151 further includes download extension 515 to manage the download requests from end user device.

As described herein, once allocated, virtual machine 141 may be used to provide a remote connection for internet browser instance 151 to end user device 110. Here, in addition to providing the remote connection, a mapping may be generated by the secure browsing service to map a storage location corresponding to download storage 510 in virtual machine 141. This mapping may include a IP address for end user device 110, a directory name for the storage location, a file name for the storage location, or any other routing information to download storage 510. Once mapped, browser instance 151 may store downloaded content locally at end user device 110. In some implementations, in providing a download to mapped download storage 510, browser instance 151 may map the download of the content directly from the content server without caching any of the content locally on virtual machine 141. In other implementations, virtual machine 141 may be used to cache at least a portion of the content, and transfer at least a portion of the content to download storage 510.

Here, in the illustrated example, a user on end user device 110 may generate a request to download content from a particular content source. Browser instance 151 receives, at step 1, the download request from end user device 110, and determines, at step 2, whether the download is permitted. In some implementations, to determine whether the download is permitted, download extension 515 may be used, wherein the extension may be configured with a set of rules when encountering a download request for objects and content. These rules may be the same for all users that use the secure browsing service, or may be specific to the user and/or user device associated with the browser session. In some examples, the rules may comprise blacklist or whitelist rules that delegate or approve which content sources are approved for downloading content. In other examples, in addition to or in place of rules related to the content source, rules may also be used that limit the types of content or files that are capable of being downloaded to download storage 510. For example, rules may prevent the download of word processing documents when a download request is identified, while images are permitted to be downloaded to download storage 510.

Once a determination is made for a download request using download extension 515, the object may be downloaded, as illustrated in step 3, to the mapped storage location on end user device 110. However, although not illustrated, if the download is not permitted, download extension 515 may prevent the download to the mapped storage location on end user device 110, and, in some examples, may notify the user that the download has been prevented. Once the object is downloaded, the object may be opened locally at end user device 110 without the use of virtual machine 141.

Although illustrated in the example of operational scenario 500 as using a download extension to determine whether or not to grant a download request, it should be understood that other management processes may be used in the determination of whether a download request should be granted. For example, library files and/or executable files may be installed with virtual machine 141 to monitor the operations in browser instance 151 and approve each download request. Further, while illustrated in the example of FIG. 5 as the request being initiated from end user device 110, it should be understood that an automated process may request a download on some of the webpages. Thus, download extension 515 may be configured to monitor all download requests, not the requests exclusively produced from a user at end user device 110.

Figure 6:
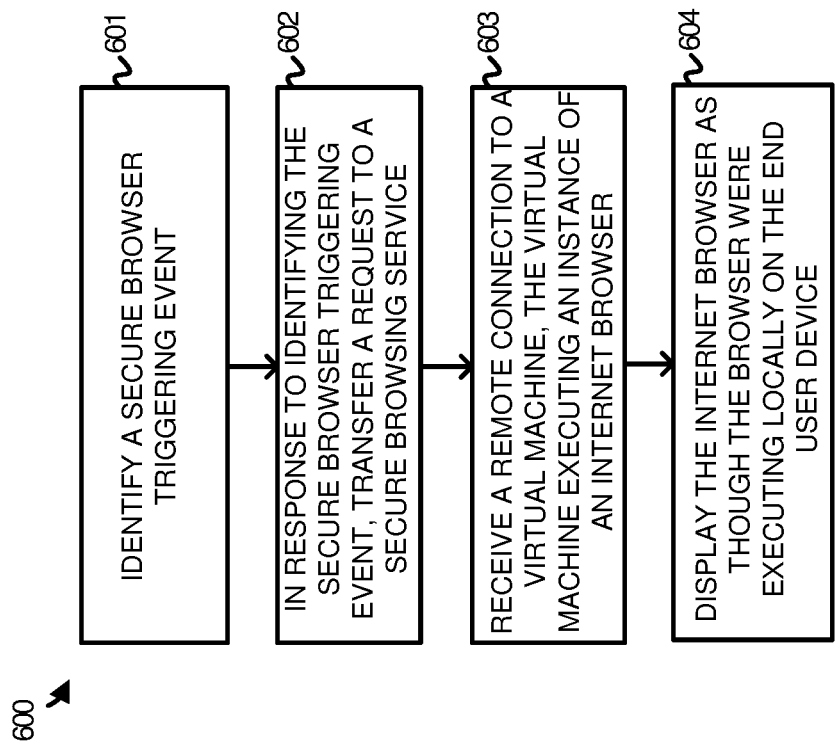
FIG. 6 illustrates an operation of an end user device to request and receive a secure browser according to an implementation.

FIG. 6 illustrates an operation 600 of an end user device to request and receive a secure browser according to one implementation. As described herein, an end user device, such as end user device 110 in FIG. 1, may include a request module responsible for requesting and providing a secure browser. To provide the secure browser, operation 600 directs the end user device to identify (601) a secure browser triggering event, wherein the event may comprise an explicit selection by a user for the browser or an event based on the browsing operations of the user. These browsing operations may include requesting a webpage that is not permitted to be accessed by the local browser, requesting an IP address that is unknown to the local browser, or some other similar triggering event.

In response to identifying the secure browser triggering event, operation 600 triggers a request to be sent to a secure browsing service (602). This request may include an identifier for the end user device, the user of the end user device, a type of browser that is being selected, or some other similar information. Once sent, operation 600 receives (603) a remote connection to a virtual machine, the virtual machine executing an instance of the requested internet browser. In some implementations, in receiving the remote connection, the secure browsing service may provide addressing information to the end user device, permitting the device to communicate with the virtual machine. Once provided with the addressing and access information, the end user device may communicate data regarding the display and operations of the browser executing in the virtual machine. In the particular example, once provided with the access information, the end user device may display (604) the internet browser from the virtual machine as though the browser were executing locally on the end user device. This may include making the browser appear similar to the local browser on the end user device, and providing the user with the ability to provide user input to the remotely executing browser.

Figure 7:
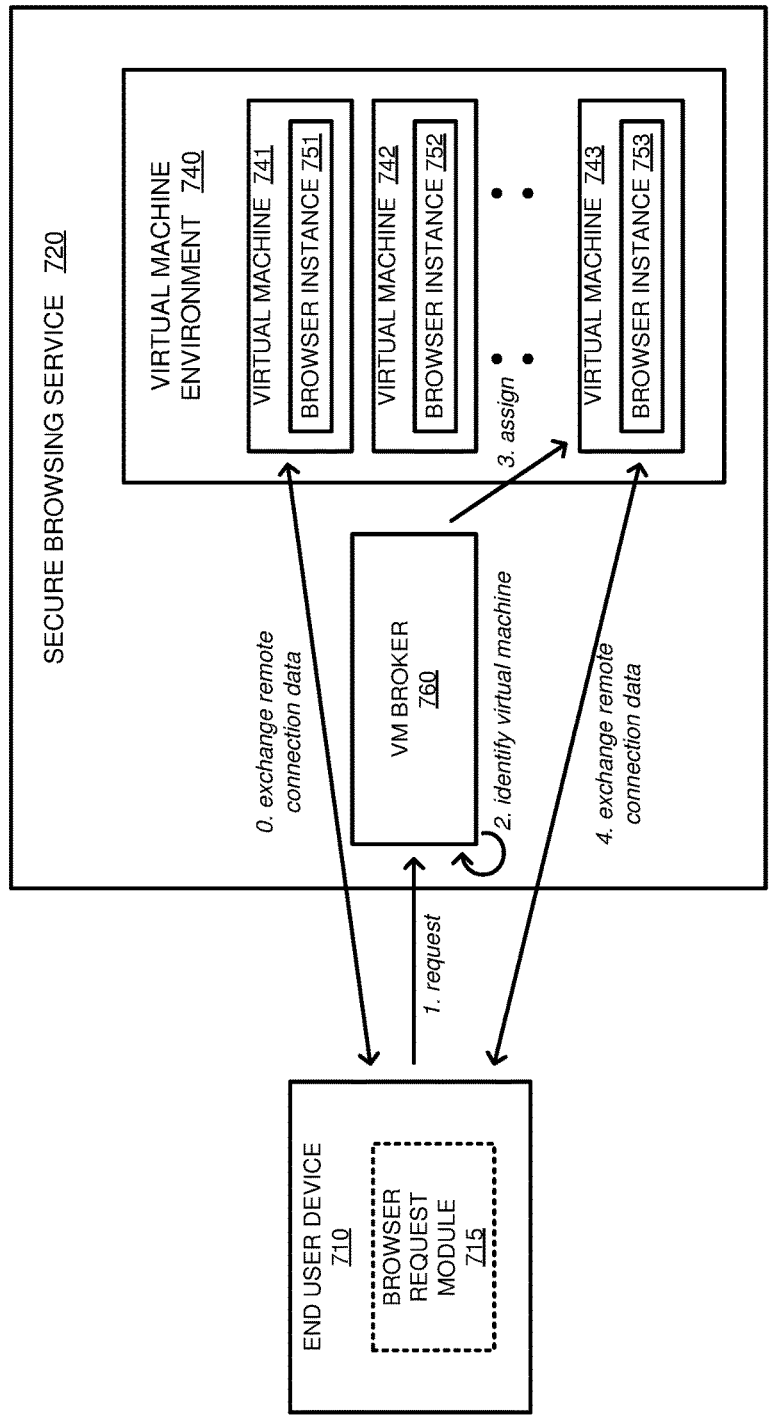
FIG. 7 illustrates an operational scenario of providing a secure browser to an end user device according to an implementation.

FIG. 7 illustrates an operational scenario 700 of providing a secure browser to an end user device according to an implementation. Operational scenario 700 is similar in configuration to computing environment 100 of FIG. 1. In particular, operational scenario 700 includes end user device 710 and secure browsing service 720, wherein secure browsing service 720 includes virtual machine (VM) broker 760 and virtual machine environment 740. Virtual machine environment 740 includes virtual machines 741-743 which may execute via one or more host computing systems and hypervisors to provide browser instances 751-753.

As depicted in the example of operational scenario 700, end user device 710 is provided, at step 0, with a connection to virtual machine 741 to exchange remote connection data with the virtual machine. This exchange of remote connection data may permit end user device 710 to, via browser request module 715, to project a visual representation of browser instance 751 based on information from virtual machine 741, and provide user interaction with the remote instance of the browser. In some implementations, this browser may appear as though it is executing locally on end user device 710. Accordingly, the display of browser instance 751 may appear similar to that of a local browser installed locally on end user device 710. In other implementations, the remote browser may appear in a remote connection window to indicate to the user that the browser is executing remotely.

Here, in addition to providing the connection to virtual machine 741, end user device 710 may require another secure browsing instance for a separate browsing location. For example, a user may initiate first secure browsing instance to access a first web page and, while browsing the first web page, may require access to a second web page. Consequently, upon identifying the requirement for the secure browser, which may be express or based on the browsing activity of the user (IP address, URL, etc.), browser request module 715 on end user device 710 may provide, at step 1, a request to secure browsing service 720. In response to the request that is received at virtual machine broker 760, virtual machine broker 760 allocates a virtual machine to support the request and may, at step 2, identify a virtual machine to support the request that is different than the current virtual machine previously allocated to end user device 710. In the present example, virtual machine broker 760 identifies virtual machine 743 with browser instance 753 to support the request, and assigns, at step 3, the virtual machine to end user device 710. Once allocated, both identified and assigned, secure browsing service 120 may provide permissions and addressing information to end user device 710 and/or virtual machine 743, such that end user device 710 may access the virtual machine over a communication network. Once the permissions are provided, end user device 710 may exchange, at step 4, remote connection data with virtual machine 743 to provide a remote connection to browser instance 753.

In some implementations, browser instances 751 and 753 may appear as separate tabs within a browser window on the end user device, however, it should be understood that browser instances 751 and 753 may use separate windows in some examples. These separate browser instances, either in separate tabs or windows, operate exclusively of one another, preventing the exchange of data from the browser on the first virtual machine from being communicated to the second virtual machine. Further, while browser instances 751-753 operate in virtual machines, it should be understood that the remote connection to the virtual machines may only permit the virtual machines to access the required browser via the remote connection, and be prevented from accessing other applications, processes, and the like that are located on the virtual machine.

In some examples, when allocating an end user device to a virtual machine, secure browsing service 720 may be configured to map a storage location on end user device 710 to the particular browser instance. This mapping permits downloads occurring in the browser instance to be downloaded to a local storage element on the device. For example, end user device 710 may designate a folder on the device to be used for the downloads from virtual machines in secure browsing service 720. In some examples, in mapping the storage location of the end user device, secure browsing service 720 may also implement download rules for providing files to the end user device. These rules may be based on the type of file that is being downloaded, the source of the download, the filename of the download, or some other similar determination. In some examples, each of the virtual machines that are allocated to end user device 710 may be mapped to a different storage location, however, it should be understood that they may be mapped to the same location in some examples.

Once a user of end user device 110 no longer requires the use of the web browser, end user device 110 may identify a termination event for browser instances 151 and 153. In response to the event, the remote connection may be terminated, and the virtual machines may be reverted back to a state prior to the use by end user device 110. This reversion in state permits secure browsing service 120 to remove any malicious processes that may have been encountered during the browsing by the user of end user device. Once reverted to the previous state, the virtual machine and browser may be allocated to another requesting end user device.

Figure 8:
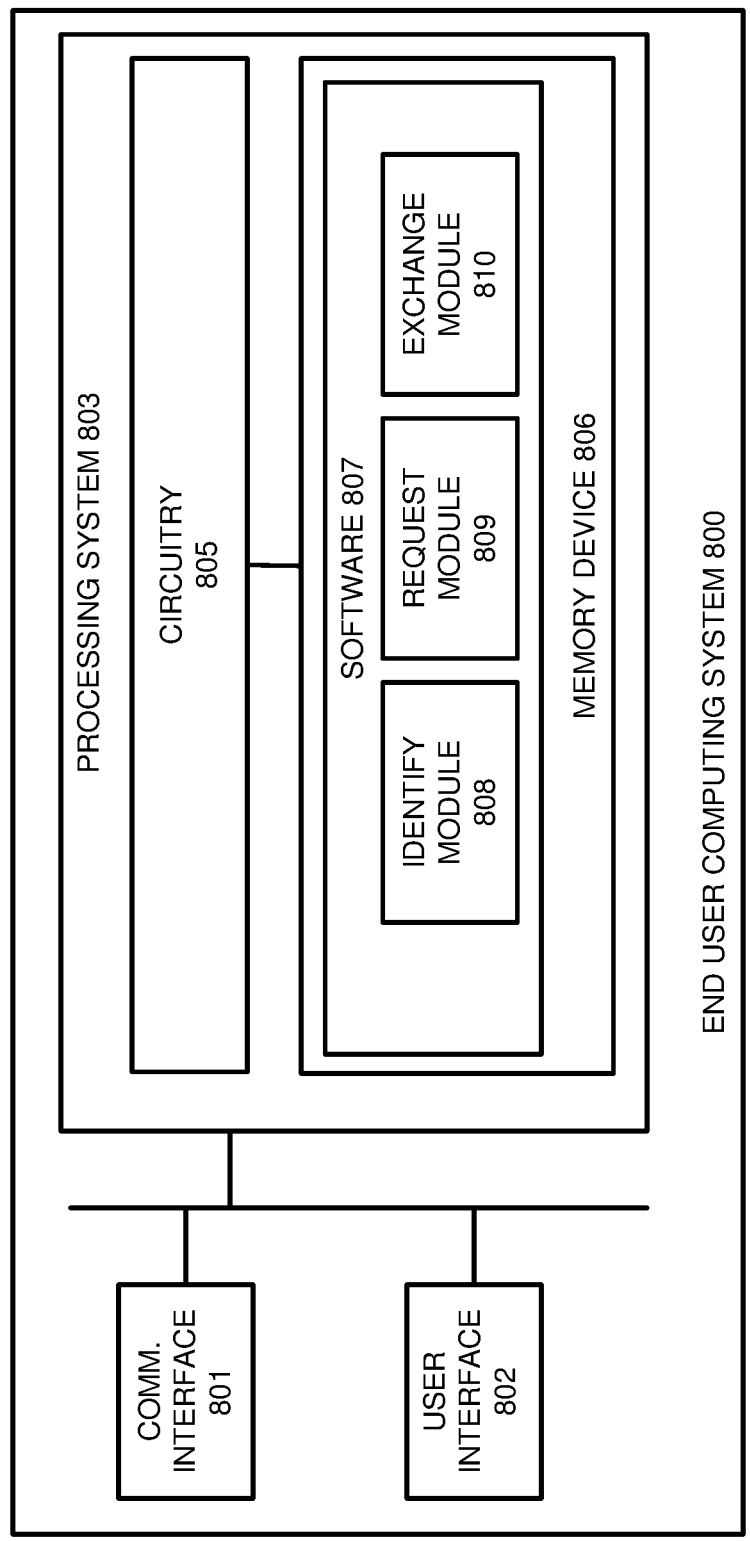
FIG. 8 illustrates an end user computing system according to an implementation.

Turning to FIG. 8, FIG. 8 illustrates an end user computing system according to an implementation. Computing system 800 is representative of any computing system or systems with which the various operational architectures, processes, scenarios, and sequences disclosed herein for an end user device may be implemented. Computing system 800 is an example of end user device 110 and end user device 710, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity. Computing system 800 may comprise a smartphone, tablet computer, a desktop computer, a laptop computer, or some other user computing apparatus.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. Communication interface 801 is configured to communicate with a secure browsing service to obtain a secure browsing session.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. In some implementations, user interface 802 may be used to provide a user interface for a remote browser executing in the remote browsing service. This may include providing a display of the application, and receiving user input with regard to the remote browser.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes identify module 808, request module 809, and exchange module 810, although any number of software modules may provide the same operation. Operating software 807 may further include an operating system, utilities, drivers, network interfaces, applications, or some other type of software. When executed by processing circuitry 805, operating software 807 directs processing system 803 to operate computing system 800 as described herein.

In one implementation, identify module 808 directs processing system 803 to identify a requirement for a secure browser for a user of end user computing system 800. This request may comprise an explicit request for the secure browser, or may be based on the browsing activities of the user of the computing device. For example, identify module 808 may monitor the browsing of the user to determine when the user visits particular URLs and IP addresses. Based on the user visiting the particular URLs and IP addresses, identify module 808 may detect the secure browsing event and, instead of using the local browser to support the request, may trigger a request for a virtual machine to provide the browsing operation. In the particular example, when identify module 808 identifies a secure browsing event, request module 809 directs processing system 803 to transfer, via communication interface 801, a request to a secure browsing service for a virtual browsing instance. Once requested, the secure browsing service may allocate a virtual machine for the secure browsing event, and provide a remote connection to the browser in the allocated virtual machine. This allocation may provide addressing information and any related security information to access the particular virtual machine.

After the virtual machine is allocated and provided by the secure browsing service, exchange module 810 directs processing system 803 to exchange remote connection information with the service. This remote connection information may include information for the remote browser to be displayed on the device, as well as user input for the user of end user computing system 800 interacting with the browser. In some examples, the display of the remote browser may appear as though the browser is executing locally on computing system 800. Accordingly, the remote connection may limit other operations on the virtual machine, and provide the user with the ability to interact with only the browser.

In some examples, in transferring the request to the secure browsing service, end user computing system 800 may provide information about the type of browser executing locally on computing system 800. For example, if the user were executing an instance of Google Chrome on end user computing system 800 and requested a URL that required a secure browser, the request delivered to the secure browsing service may indicate the Google Chrome requirement. As a result, the secure browsing service may select a virtual machine with an instance of Google Chrome, and provide a remote connection to the virtual machine. Thus, the remote browser may operate similar to the browser of the local computing system.

Figure 9:
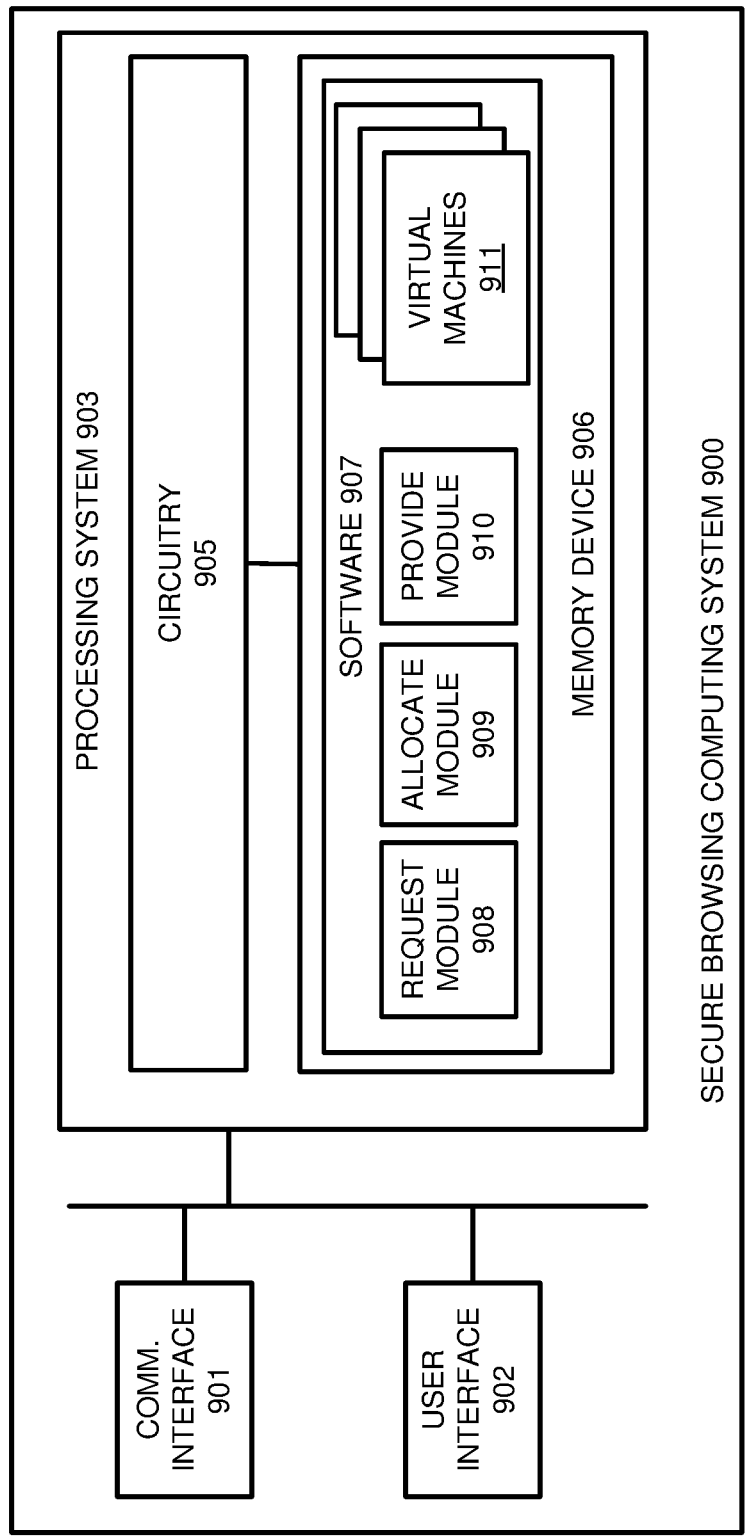
FIG. 9 illustrates a secure browsing computing system according to an implementation.

FIG. 9 illustrates a secure browsing computing system 900 according to an implementation. Computing system 900 is representative of any computing system or systems with which the various operational architectures, processes, scenarios, and sequences disclosed herein for a secure browsing service may be implemented. Computing system 900 is an example of secure browsing services 120 and 720, although other examples may exist. Computing system 900 comprises communication interface 901, user interface 902, and processing system 903. Processing system 903 is linked to communication interface 901 and user interface 902. Processing system 903 includes processing circuitry 905 and memory device 906 that stores operating software 907. Computing system 900 may include other well-known components such as a battery and enclosure that are not shown for clarity. Computing system 900 may comprise one or more serving computing systems, desktop computing systems, or any other similar computing systems capable of providing the secure browsing services described herein.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. Communication interface 901 is configured to communicate with one or more end user devices to provide the devices with remote sessions to internet browser instances.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes request module 908, allocate module 909, provide module 910, and virtual machines 911, although any number of software modules may provide the same operation. Operating software 907 may further include an operating system, utilities, drivers, network interfaces, applications, or some other type of software. When executed by processing circuitry 905, operating software 907 directs processing system 903 to operate computing system 900 as described herein.

In an implementation, request module 908 directs processing system 903 to receive a request from an end user device for a remote browser session. In response to the request, allocate module 909 directs processing system 903 to identify a virtual machine in virtual machines 911 to support the request, and assign the virtual machine for use by the requesting end user device. Once allocated, provide module 908 may be used to provide a remote connection to the internet browser on the virtual machine to the requesting end user device. In some examples, in providing the remote connection, provide module 910 may provide the requesting end user device with access information, such as addressing and security information to access the selected virtual machine. In some instances, in identifying the virtual machine for the end user device, the virtual machine may be required to be initiated or started to support the operations of the end user device. In other instances, the virtual machine that's allocated to the end user device may comprise an idle virtual machine that is not providing browsing operations for any other user.

In some implementations, in addition to providing the end user device with access to the virtual machine, provide module 910 may further direct processing system 903 to map a file storage location on the end user device to the internet browser of the allocated virtual machine. This mapping may include configuring the browser in the virtual machine to a route downloads to a particular destination path on the end user device which may include a directory, a file, or some other similar location on the end user device. Once mapped, the allocated virtual machine, using an extension or some other process located thereon, may identify a download request for an object in the internet browser, identify a rule set for download requests in the internet browser, and determine whether a download of the object associated with the download request is permitted based on the rule set. In some implementations, all users that request virtual machines using secure browsing computing system 900 may be allocated the same permissions and rules. In other examples, each user device that requests a browser in a virtual machine may be provided with different download permissions and rules. These permissions and rules may include limiting the types of files that are capable of being downloaded, limiting the content sources from which files can be downloaded (IP addresses, URLs, and the like), or some other limitation rules on the downloads. If it is determined that a download may be provided, then the extension or process on the virtual machine may download the requested object to the file storage location on the end user device. If it is determined that a download is not to be provided, the extension or process on the virtual machine may prevent the download from being provided to the end user device, and may further provide a notification to the user indicating that such a download is not permitted.

Returning to the elements of computing environment 100 of FIG. 1, end user device 110 can be subscriber equipment, customer equipment, access terminal, smartphone, personal digital assistant (PDA), computer, tablet computing device, e-book, Internet appliance, media player, game console, or some other user communication apparatus capable of exchanging a remote desktop connection. End user device 110 can include communication interfaces, network interfaces, processing systems, computer systems, microprocessors, storage systems, storage media, or some other processing devices or software systems.

Secure browsing service 120 can include communication interfaces, network interfaces, processing systems, computer systems, microprocessors, storage systems, storage media, or some other processing devices or software systems, and can be distributed among multiple devices. Examples of secure browsing service 120 can include software such as an operating system, logs, databases, utilities, drivers, networking software, and other software stored on a computer-readable medium. Secure browsing service 120 may comprise, in some examples, one or more server computing systems, desktop computing systems, laptop computing systems, or any other computing system, including combinations thereof. In some examples, secure browsing service 120 may operate as a cloud service or in a data center.

Communication link 170 can use metal, glass, optical, air, space, or some other material as the transport media. Communication link 170 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 170 can be a direct link or can include intermediate networks, systems, or devices, and can include a logical network link transported over multiple physical links. Although one main link for communication link 170 is shown in FIG. 1, it should be understood that link 170 is merely illustrative to show communication modes or access pathways. In other examples, further links can be shown, with portions of the further links shared and used for different communication sessions or different content types, among other configurations. Communication link 170 can include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions. Although illustrated in the example of FIG. 1 with a single device communicating with secure browsing service 120, it should be understood that any number of end user devices may use secure browsing service 120 to provide secure browsing.

Although illustrated in the examples of FIGS. 1-9 using virtual machines as the platform for the browsers, it should be understood that containers may be used in place of the full operating system virtual machines. These containers may include Docker containers, Linux containers, Windows containers, jails, or another similar type of virtual containment node, which can provide an efficient management of resources from a host system. The resources used by the containers may include kernel resources from the operating system of the host computing system, and may further include repositories and other approved resources that can be shared with other containers or processes executing on the host. However, although resources may be shared between the containers on a host, the containers are provisioned to have private access to the operating system with their own identifier space, file system structure, and network interfaces.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of providing secure browsers to end user devices, the method comprising:
   in a secure browsing service, receiving, over a network, a request for an internet browser from an end user device;
   in response to the request, allocating a virtual machine on a server to the end user device, the virtual machine having an instance of the internet browser executing thereon;
   providing a remote connection to the internet browser on the virtual machine to the end user device that enables the end user device to remotely access the internet browser operating on the virtual machine on the server over the network while locally displaying an interface of the internet browser;
   mapping a file storage location on the end user device to the internet browser of the virtual machine;
   identifying a download request for an object in the internet browser on the virtual machine;
   identifying a rule set for download requests in the internet browser, wherein the rule set comprises a set of one or more file types approved for download;
   determining whether a download of the object associated the download request is permitted based on the rule set and a file type of the object; and
   if the download request is permitted, downloading the object to the file storage location from the internet browser of the virtual machine.

2. The method of claim 1 wherein the rule set for download requests in the internet browser further indicates approved source internet protocol addresses or source uniform resource locators for downloads.

3. The method of claim 1 wherein identifying the rule set for the download requests in the internet browser comprises identifying the rule set for the download requests in the internet browser based on a user identifier associated with the end user device.

4. The method of claim 1 wherein the request for the internet browser from the end user device occurs in response to a user of the end user device requesting an untrusted internet protocol address or uniform resource locator in an internet browser instance executing locally on the end user device.

5. The method of claim 1 further comprising:
receiving, over the network, a second request for a second internet browser from the end user device;
allocating a second virtual machine with a second instance of the internet browser executing thereon to the end user device;
providing a second remote connection to the internet browser on the second virtual machine to the end user device.

6. The method of claim 1 wherein allocating the virtual machine with the instance of the internet browser executing thereon to the end user device comprises allocating an idle virtual machine with the instance of the internet browser executing thereon to the end user device.

7. The method of claim 1 wherein allocating the virtual machine with the instance of the internet browser executing thereon to the end user device comprises initiating execution of the virtual machine with the instance of the internet browser for the end user device.

8. A computer apparatus comprising:
one or more computer readable storage media;
a processing system operatively coupled with the one or more computer readable storage media; and
program instructions stored on the one or more computer readable storage media to provide secure browsers to end user devices that, when read and executed by the processing system, direct the processing system to:
receive, over a network, a request for an internet browser from an end user device;
in response to the request, allocate a virtual machine on a server to the end user device, the virtual machine having an instance of the internet browser executing thereon to the end user device;
provide a remote connection to the internet browser on the virtual machine to the end user device that enables the end user device to remotely access the internet browser operating on the virtual machine on the server over the network while locally displaying an interface of the internet browser;
map a file storage location on the end user device to the internet browser of the virtual machine;
identify a download request for an object in the internet browser on the virtual machine;
identify a rule set for download requests in the internet browser, wherein the rule set comprises a set of one or more file types approved for download;
determine whether a download of the object associated the download request is permitted based on the rule set and a file type of the object; and
if the download request is permitted, download the object to the file storage location from the internet browser of the virtual machine.

9. The computer apparatus of claim 8 wherein the rule set for download requests in the internet browser further indicates approved source internet protocol addresses or source uniform resource locators for downloads.

10. The computer apparatus of claim 8 wherein the program instructions to identify the rule set for the download requests in the internet browser direct the processing system identify the rule set for the download requests in the internet browser based on a user identifier associated with the end user device.

11. The computer apparatus of claim 8 wherein the program instructions further direct the processing system to:

receive, over the network, a second request for a second internet browser from the end user device;
allocate a second virtual machine with a second instance of the internet browser executing thereon to the end user device;
provide a second remote connection to the internet browser on the second virtual machine.

12. The computer apparatus of claim 8 wherein the program instructions to allocate the virtual machine with the instance of the internet browser executing thereon to the end user device direct the processing system to:
allocate an idle virtual machine with the instance of the internet browser executing thereon to the end user device; or
initiate execution of the virtual machine with the instance of the internet browser for the end user device.

13. An apparatus comprising:
one or more computer readable storage media;
program instructions stored on the one or more computer readable storage media to request and receive remote browsing instances on an end user device that, when read and executed by a processing system direct the processing system to:
identify a secure browsing event;
in response to the secure browsing event, transfer a request over a network for an internet browser to a secure browsing service;
receive, over the network, a remote connection to an internet browser executing in a virtual machine of the secure browsing service, wherein the remote connection enables the end user device to remotely access the internet browser operating on the virtual machine and display an interface of the internet browser;
map a file storage location on the end user device to the internet browser executing in the virtual machine; and
generate a download request for an object in the internet browser on the virtual machine; and
download the object to the file storage location from the internet browser of the virtual machine.

14. The apparatus of claim 13 wherein the program instructions to identify the secure browsing event direct the processing system to identify an express request for a secure browser from the user of the end user device.

15. The apparatus of claim 13 wherein the program instructions to identify the secure browsing event direct the processing system to:
monitor browsing in an internet browser instance executing locally on the end user device;
identify when the browsing meets secure browsing criteria.

16. The apparatus of claim 15 wherein the program instructions to identify when the browsing meets secure browsing criteria direct the processing system to identify when the browsing requests untrusted internet protocol addresses or uniform resource locators.

17. The apparatus of claim 13 wherein the program instructions further direct the processing system to display the internet browser as though the internet browser were executing locally on the end user device.

* * * * *